United States Patent
Kamachi

(10) Patent No.: US 8,547,040 B2
(45) Date of Patent: Oct. 1, 2013

(54) CONTROL APPARATUS OF ELECTRIC VEHICLE

(75) Inventor: Makoto Kamachi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 270 days.

(21) Appl. No.: 13/094,393

(22) Filed: Apr. 26, 2011

(65) Prior Publication Data
US 2011/0260659 A1 Oct. 27, 2011

(30) Foreign Application Priority Data
Apr. 27, 2010 (JP) ................. P2010-102077

(51) Int. Cl.
*H02P 1/00* (2006.01)
*H02P 3/00* (2006.01)
*H02P 5/00* (2006.01)

(52) U.S. Cl.
USPC ...... 318/139; 318/432; 318/434; 318/400.07; 318/400.15; 318/400.23; 180/65.1; 180/65.21

(58) Field of Classification Search
USPC ............... 318/139, 432, 434, 400.07, 400.15, 318/400.23; 180/65.1, 65.21
See application file for complete search history.

(56) References Cited

U.S. PATENT DOCUMENTS

| 7,019,472 | B2 | 3/2006 | Kayukawa et al. | |
|---|---|---|---|---|
| 7,734,406 | B1 * | 6/2010 | Oppenheimer et al. | 701/70 |
| 7,765,964 | B2 * | 8/2010 | Ichimoto | 123/90.15 |
| 7,906,863 | B2 * | 3/2011 | Yaguchi | 290/40 B |
| 7,960,928 | B2 * | 6/2011 | Tang | 318/400.09 |
| 7,990,085 | B2 * | 8/2011 | Furukawa et al. | 318/142 |
| 8,022,674 | B2 * | 9/2011 | Miura | 320/132 |
| 2003/0169001 | A1 | 9/2003 | Murakami et al. | |
| 2004/0106494 | A1 * | 6/2004 | Bhavsar et al. | 477/2 |
| 2007/0145954 | A1 | 6/2007 | Kawahara et al. | |
| 2007/0187161 | A1 * | 8/2007 | Kiuchi | 180/65.2 |
| 2008/0105477 | A1 * | 5/2008 | Abe | 180/65.2 |
| 2008/0228334 | A1 * | 9/2008 | Hashimoto | 701/22 |
| 2010/0250041 | A1 | 9/2010 | Li | |

FOREIGN PATENT DOCUMENTS

| CN | 1466526 A | 1/2004 |
|---|---|---|
| CN | 101214797 A | 7/2008 |
| JP | 2003-259509 A | 9/2003 |
| JP | 2005-218250 A | 8/2005 |

(Continued)

OTHER PUBLICATIONS

Japanese Office Action issued Jun. 5, 2013 for corresponding Japanese Application No. 2010-102077 with English translation.

*Primary Examiner* — Erick Glass
(74) *Attorney, Agent, or Firm* — Birch, Stewart, Kolasch & Birch, LLP

(57) ABSTRACT

A control apparatus of an electric vehicle, which is operable to be driven by supplying electric power from a battery to an electric motor to drive the electric motor and operable to perform regeneration charge, includes: a request torque calculating unit calculating a request torque of the electric motor; a motor control unit controlling the electric motor based on the request torque; and a torque suppression unit performing a feed forward control for setting the request torque based on a rotational angular speed of the electric motor so that an integrated value of a torque and a rotational angular speed of the electric motor at time when the electric motor is driven or the regeneration charge is performed is identical to an integrated value of the torque and the rotational angular speed stored at a point of time when the battery voltage or the battery current reaches the limit level.

7 Claims, 4 Drawing Sheets

(56) References Cited

FOREIGN PATENT DOCUMENTS

| JP | 2005-218251 A | 8/2005 |
| JP | 2007-165211 A | 6/2007 |
| JP | 4052080 B2 | 2/2008 |
| JP | 4200956 B2 | 12/2008 |

* cited by examiner

CONTROL APPARATUS OF ELECTRIC VEHICLE

BACKGROUND OF THE INVENTION

The present invention relates to a torque control technique of an electric motor for driving an electric vehicle.

An electric vehicle is provided with an electric motor and a battery. The motor is driven by electric power supplied from the battery, so that the vehicle can run. To reduce power consumption in such an electric motor vehicle, it has been developed a technique by which a driving energy is converted to an electric energy by an electric motor (motor generator) during a deceleration thereby enabling regeneration-charging of the battery.

The electric vehicle is configured to calculate a motor torque requested by a driver based on information on, for example, an accelerator pedal opening, a vehicle speed and the like, and control a torque of the electric motor by controlling a motor controller (inverter) to generate a power-running (driving) torque during acceleration and a regeneration torque during deceleration.

Generally, a battery is limited in a usable range of a changing rate of the battery, which is related to an open end voltage of the battery. In a case that the battery is charged or discharged over the usable range, the battery may be deteriorated. Also, in a case that a battery current, which is a current flowing in the battery when the battery is charged or discharged, exceeds acceptable amount, the battery may be deteriorated.

A technique has been developed, which is capable of controlling a battery to prevent a charging rate of the battery or a battery current from exceeding the usable range (see Japanese Patent No. 4052080 and Japanese Patent No. 4200956).

In a control apparatus disclosed in Japanese Patent No. 4052080, a maximum level and a minimum level are set for a battery voltage or a battery current in accordance with a battery state such as a temperature of the battery when an electric motor drive is controlled.

In a control apparatus disclosed in Japanese Patent No. 4200956, charging and discharging time of the battery is limited in accordance with a temperature of the battery thereby preventing a charging rate of the battery from exceeding the usable range largely.

However, since a battery has an internal resistance, when the battery is charged and discharged, variation of voltage corresponding to an integrated value of the battery current and internal resistance is occurred. Accordingly, even though it is controlled in the same manner as disclosed, for example, in Japanese Patent No. 4052080 and Japanese Patent No. 4200956, if the operation of the electric motor is changed when the charging rate of the battery or the battery current is near the limit value, the charging rate of the battery or the battery current may exceed the limit level. For example, if the driving current of the electric motor is increased and the discharging current of the battery is increased to accelerate the vehicle when the charging rate of the battery is near the lower limit level, the battery voltage falls below the lower limit level and an over discharge may be occurred. Alternatively, if a vehicle runs along a downhill when the charging rate of the battery is near the higher limit level, at the time of regeneration charge, a rotational speed of the electric motor is increased and the charging current of the battery is increased, thereby the battery voltage may exceed the higher limit level and an over charge may be occurred.

SUMMARY

It is therefore an object of the invention to provide a control apparatus of an electric vehicle capable of controlling a battery voltage or a battery current not to exceed the limit level even when an operation of an electric motor is changed, thereby preventing a battery from being deteriorated.

In order to achieve the object, according to the invention, there is provided a control apparatus of an electric vehicle, the electric vehicle operable to be driven by supplying electric power from a battery to an electric motor to drive the electric motor and operable to perform regeneration charge to charge the battery by electric power generated by the electric motor using deceleration energy, the control apparatus comprising: a request torque calculating unit calculating a request torque of the electric motor; a motor control unit controlling the electric motor based on the request torque calculated by the request torque calculating unit; and a torque suppression unit suppressing the request torque of the electric motor so that a battery voltage or a battery current does not exceed or fall below a limit level when the electric motor is driven or the regeneration charge is performed, the torque suppression unit storing a torque of the electric motor and a rotational angular speed of the electric motor at a point of time when the battery voltage or the battery current reaches the limit level, the torque suppression unit performing a feed forward control for setting the request torque based on the rotational angular speed of the electric motor so that an integrated value of the torque of the electric motor and the rotational angular speed of the electric motor at time when the electric motor is driven or the regeneration charge is performed is identical to an integrated value of the torque of the electric motor and the rotational angular speed of the electric motor which are stored at the point of time when the battery voltage or the battery current reaches the limit level.

The limit level may include a lower limit level of the battery voltage when the battery is discharged.

The limit level may include a higher limit level of the battery voltage when the battery is charged.

The limit level may include a higher limit level of the battery current when the battery is charged or discharged. The higher limit level may be set based on a temperature of the battery.

When the battery is discharged, in a high temperature region of the temperature of the battery, the higher limit level may be lower than that in a middle temperature region of the temperature of the battery. When the battery is charged, in a high temperature region and a low temperature region of the temperature of the battery, the higher limit level may be lower than that in a middle temperature region of the temperature of the battery.

The torque suppression unit may perform a feed back control for compensating the request torque of the electric motor based on a difference between the battery voltage or the battery current and the limit level when the battery voltage or the battery current exceeds or falls below the limit level.

DETAILED DESCRIPTION OF EMBODIMENTS

Hereinafter, an embodiment of the present invention will be described with reference to the drawings.

Figure 1:
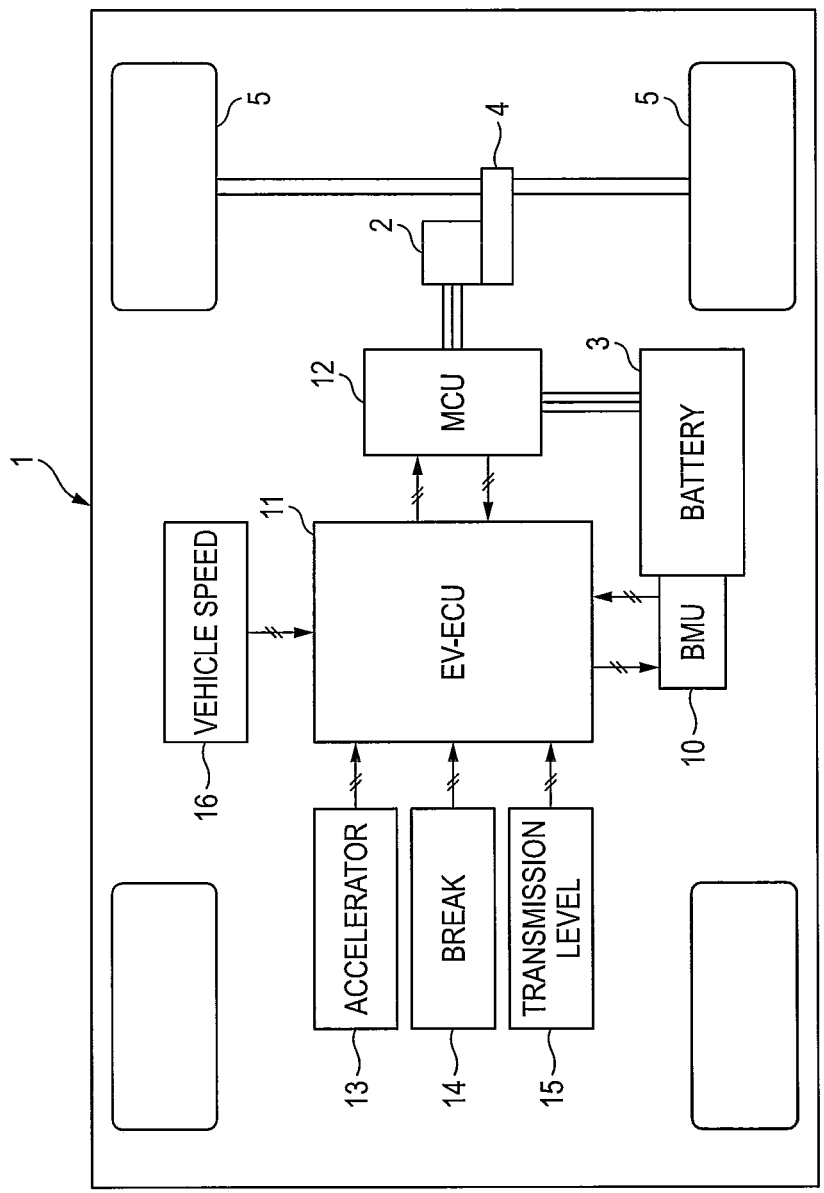
FIG. 1 is a schematic block diagram showing an electric vehicle according to an embodiment of the present invention.

FIG. 1 is a schematic block diagram showing an electric vehicle according to a embodiment of the present invention. As shown in FIG. 1, it shows a schematic structure of an electric vehicle according to a embodiment of the present invention.

The electric vehicle according to the embodiment of the present invention is provided therein with a motor generator 2 (electric motor) as a driving source. The motor generator 2 is supplied with electric power from a battery 3 mounted in the vehicle to thereby be driven and serves to drive driving wheels 5 through a decelerator 4. Also, the motor generator 2 is driven by rotation of the driving wheels 5 to have a function of power generation. Electric power generated by the motor generator 2 is supplied to the battery 3 to charge the battery 3 (function of regeneration charge). The battery 3 is formed of a plurality of cells which are arranged therein in series. The vehicle 1 includes a BMU 12 (battery management unit), an EV-ECU 11 (EV electronic control unit) and a MCU 12 (motor control unit). The MCU 10 has a function for monitoring a state of the battery 3, in more detail, a voltage of each of the cells in the battery 3, a battery voltage Vbat which is a voltage of the whole battery, a temperature of each of the cells in the battery 3, and a battery current Ibat which is a current flowing in the battery 3. The EV-ECU 11 into which an accelerator operating amount from an accelerator operating unit 13, a break operating amount from a break operating unit 14, a transmission level from a transmission 15, and a vehicle speed from a vehicle speed sensor 16 are input, as a request torque calculating unit, calculates a request torque Treq of the motor generator 2 based on the input amounts, and outputs a torque command value T" to the MCU 12 based on the request torque Treq. The MCU 12 is configured by an inverter unit and has a function of controlling an output torque and a regeneration torque of the motor generator 2. In more detail, The MCU 12 drives and controls the motor generator 2 based on the torque command value T" which is input from the EV-ECU 11, and controls electric power generated by the motor generator 2 at the time of regeneration charge to supply the electric power to the battery 3. Also, the MCU 12 has a function of outputting, to the EV-ECU 11, a motor torque T and a motor rotational angular speed ω at the present time.

In addition, the EV-ECU 11 according to this embodiment controls a torque of the motor generator 2 so that a charging rate of the battery 3 is maintained in a usable range thereof.

Figure 2:
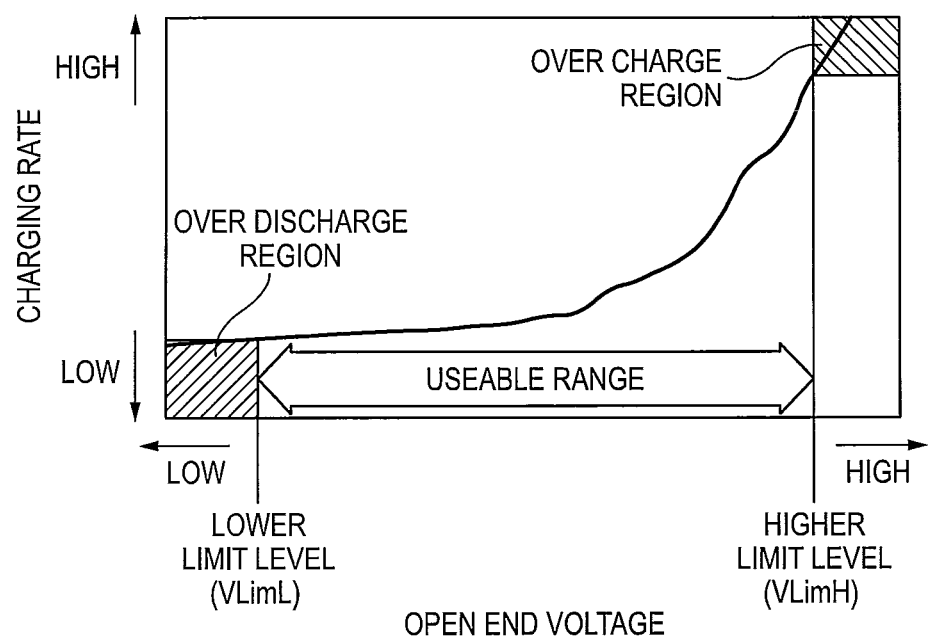
FIG. 2 is a graph showing the relationship between a charging rate of a battery and an open end voltage of the battery.

FIG. 2 is a graph showing the relationship between a charging rate and an open end voltage of the battery 3.

As shown in FIG. 2, since the charging rate of the battery 3 has unambiguous relationship with the open end voltage of the battery 3, if the charging rate decreases, the open end voltage also decreases.

Also, since the battery 3 has an internal resistance, the battery 3 has a characteristic that the battery voltage Vbat drops so as to correspond to an integrated value of the discharging current and the internal resistance at the time when the battery 3 is discharged. In view of the above, in the embodiment, in a case where a minimum cell voltage Vmin of the battery 3 reaches the lower limit level VlimL at the time of acceleration, a first torque control is performed for controlling a torque of the motor generator 2 so that the minimum cell voltage Vmin of the battery 3 does not fall below the lower limit level VlimL.

Figure 3:
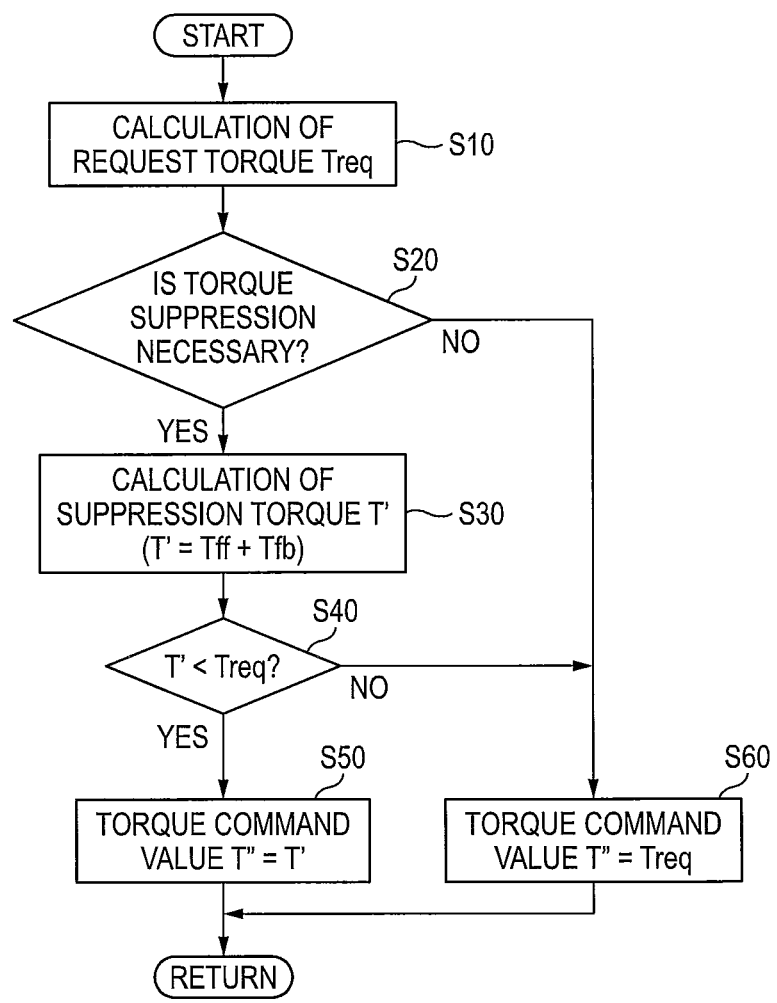
FIG. 3 is a flow chart showing a torque control process of an electric motor.

FIG. 3 is a flow chart showing a torque control process of the motor generator 2. This routine is repeated at the time of driving.

First, at step S10, the request torque Treq is calculated (a request torque calculating unit). As described above, the request torque Treq is calculated based on an accelerator operating amount which is input from the accelerator operating unit 13, a vehicle speed which is input from the vehicle speed sensor 16, etc. Then, step S20 is proceeded.

At step S20, it determines whether torque suppression is necessary or not. The determination of whether the torque suppression is necessary or not is made by determining whether the minimum cell voltage Vmin of the battery 3 is equal to or lower than the lower limit level VlimL or not. In a case where the minimum cell voltage Vmin is equal to or lower than the lower limit level VlimL (condition 1), it is determined that the torque suppression is necessary. In a case where the request torque Treq having been calculated at step S10 is equal to or lower than a value, which is calculated at a previous step, of a suppression torque T' that is calculated at step S30 which will be described later (condition 2), it is determined that the torque suppression is not necessary. Also, the result of the determination of whether the torque suppression is necessary or not is stored, in a case where the above conditions 1 and 2 are not satisfied, the previously determined result is maintained. In an initial state, it is determined that the torque suppression is not necessary. In a case where the torque suppression is necessary, step S30 is proceeded.

At step S30, the suppression torque T' for maintaining the minimum cell voltage Vmin as to be equal to the lower limit level VlimL is calculated. In detail, the suppression torque T', as shown in the following equation (1), is a total value of a feed forward control torque Tff and a feedback control torque Tfb which will be described later.

$$T'=Tff+Tfb \tag{1}$$

The feed forward control torque Tff is obtained by the following equation (2).

$$Tff=T1\times\omega 1/107 \tag{2},$$

where T1 is a motor torque at the time when the minimum cell voltage Vmin reaches the lower limit level VlimL, ω1 is a motor rotational angular speed at the time when the minimum cell voltage Vmin reaches the lower limit level VlimL. The motor torque T1 and the motor rotational angular speed ω1 are the values input from the MCU 12 when the minimum cell voltage Vmin reaches the lower limit level VlimL. Also, ω which is the motor rotational angular speed at the present time is input from the MCU 12.

The feedback control torque Tfb is obtained by the following equation (3).

$$Tfb=\eta\times Vbat\times(Kp+Ki/S)(VlimL-Vmin)/\omega \tag{3}$$

where, η is a motor system efficiency, Kp is a proportional gain, Ki is an integral gain, these are values set in advance together with the lower limit level VlimL. S is a Laplace operator, and the battery voltage Vbat and the minimum cell voltage Vmin are input from the BMU 10.

Next, step S40 is proceeded.

At step S40, it is determined whether or not the suppression torque T' which is calculated at step S30 is less than the request torque Treq which is calculated at step S10. In a case where the suppression torque T' is less than the request torque Treq, step S50 is proceeded.

At step S50, a final torque command value T" to be output to the MCU 12 is set as the suppression torque T' having been calculated at step S30. And this routine is returned.

In a case where it is determined at step S20 that the torque suppression is not necessary, or it is determined at step S40 that the suppression torque T' is equal to or greater than the request torque Treq, step S60 is proceeded.

At step S60, a final torque command value T" is set as the request torque Treq having been calculated at step S10. And, the routine is returned.

Meanwhile, a series of controls from step S30 to step S50 in this routine correspond to a torque suppression unit.

As described above according to this embodiment, in the first torque control, in a case where a torque command value T" of the motor generator 2 is set, when the minimum cell voltage Vmin becomes equal to or lower than the lower limit level VlimL, the suppression torque T' for maintaining the battery voltage as to be equal to the lower limit level VlimL is calculated, and one of the suppression torque T' and the request torque Treq which is a smaller one is set as a final torque command value T".

In this embodiment, as shown in equation (1), the suppression torque T' is obtained by the total value of the feed forward control torque Tff and the feedback control torque Tfb. The feedback control torque Tfb is feedback-controlled by the so called PI control, based on the difference between the minimum cell voltage Vmin and the lower limit level VlimL, and controlled so that the minimum cell voltage Vmin is maintained as to be equal to the lower limit level VlimL when the minimum cell voltage Vmin falls below the lower limit level VlimL. Thereby, in a case where the discharging current of the battery 3 is changed by acceleration and the like or in a case where the voltage drop is occurred by use of an electric device other than the motor generator 2 and then the minimum cell voltage Vmin falls below the lower limit level VlimL, a torque control of the motor generator 2 is performed so that the minimum cell voltage Vmin is maintained as to be equal to the lower limit level VlimL.

In this embodiment, a feed forward control is performed as well as a feedback control. The feed forward control torque Tff is obtained by calculation that an integrated value of the motor torque T1 and the motor rotational angular speed $\omega 1$ at the time when the minimum cell voltage Vmin reaches the lower limit level VlimL is divided by the motor rotational angular speed $\omega$ at the present time. Thereby, the minimum cell voltage Vmin is maintained as to be equal to the lower limit level VlimL. Hereinafter, the reasons thereof will be described.

If there is no electric power consumption other than that of the motor generator 2, the relationship between the motor torque T, the motor rotational angular speed $\omega$, the motor system efficiency η, the battery voltage Vbat, and the battery current Ibat is expressed by the following equation (4).

$$T\omega = \eta \times Vbat \times Ibat \tag{4}$$

In order to keep the battery voltage Vbat constant, if an internal resistance of the battery is constant, the battery current Ibat should be constant. If the motor system efficiency η is also constant, both sides of the equation (4) have constant values. In order to keep the battery voltage constant, motor output Tω should be maintained constantly. Accordingly, if the motor torque T1 and the motor rotational angular speed $\omega 1$ at the time when the minimum cell voltage Vmin reaches the lower limit level VlimL are stored, and an integrated value of them becomes equal to an integrated value of the motor torque T and the motor rotational angular speed $\omega$, the minimum cell voltage Vmin is maintained as to be equal to the lower limit level VlimL even though the motor rotational angular speed $\omega$ is changed.

In this embodiment, not only by performing the feedback control but also by performing the feed forward control of making the integrate value of the motor torque T and the motor rotational angular speed $\omega$ constant, the torque control of the motor can quickly be performed even though the battery current Ibat is changed and the battery voltage Vbat is accordingly changed by changing the operation of the motor generator 2 (changing the motor rotational angular speed $\omega$), thereby the minimum cell voltage Vmin can be maintained as to be equal to the lower limit level VlimL certainly.

The EV-ECU 11 not only maintains the minimum cell voltage Vmin as to be equal to the lower limit level VlimL but also performs a second torque control for maintaining a maximum cell voltage Vmax as to be equal to a higher limit level VlimH.

Hereinafter, the second torque control will be described.

In the second torque control, the motor torque T2 and the motor rotational angular speed $\omega 2$ at the time when the maximum cell voltage Vmax which is a maximum value of a voltage of each of the cells of the battery 3 reaches the higher limit level VlimH are stored, and at step S30 of the flow chart shown in FIG. 3, the motor torque T is controlled in response to the change of the motor rotational angular speed $\omega$ so that an integrated value of the motor torque T2 and the motor rotational angular speed $\omega 2$ which are stored becomes equal to an integrated value of the motor torque T and the motor rotational angular speed $\omega$ at the present time. In detail, the feed forward control torque Tff is calculated with the following equation (5), the feedback control torque Tfb is calculated with the following equation (6), and the suppression torque T' is calculated with the equation (1) which is used in the first torque control.

$$Tff = T2 \times \omega 2/\omega \tag{5}$$

$$Tfb = \eta \times Ibat \times (Kp + Ki/S) \times (Vmax - VlimH)/\omega \tag{6}$$

In this manner, in the second torque control, in a case where the charging current (battery current Ibat) of the battery 3 is changed at the time of regeneration charge or in a case where the voltage rise is occurred when the use of an electric device other than the motor generator 2 is stopped, a torque control of the motor generator 2 is performed so that the maximum cell voltage Vmax is maintained as to be equal to the higher limit level VlimH. Particularly, by adding the feed forward control torque Tff, the battery voltage can be controlled quickly not to exceed the higher limit level VlimL.

By the first torque control and the second torque control, the battery voltage is controlled not to exceed the higher limit level VlimH and not to fall below the lower limit level VlimL thereby the battery voltage can be maintained in a usable range when the battery is charged or discharged. Thus, the battery 3 can be prevented from being deteriorated.

Also, in this embodiment, a third torque control may be zo performed, which controls a torque of the motor generator 2 so that the charging current or the discharging current of the battery 3 does not exceed a higher limit level IlimH.

Hereinafter, the third torque control will be described.

In the third torque control, the battery current Ibat instead of the maximum cell voltage Vmax and the battery voltage Vbat which are used in the second torque control is controlled not to exceed the higher limit level IlimH. In detail, the feed forward control torque Tff, which is calculated at step S30 of the flow chart shown in FIG. 3, is calculated with the following equation (7), and the feedback control torque Tfb is calculated with the following equation (8).

$$Tff = T3 \times \omega 3/\omega \tag{7}$$

$$Tfb = \eta \times Vbat \times (Kp' + Ki'/S) \times (Ibat - IlimH)/\omega \tag{8}$$

where, T3 is a motor torque at the time when the battery current reaches the higher limit level IlimH, ω3 is a motor rotational angular speed at the time when the battery current reaches the higher limit level IlimH, Kp' is a proportional gain, and Ki' is an integral gain.

Figure 4:
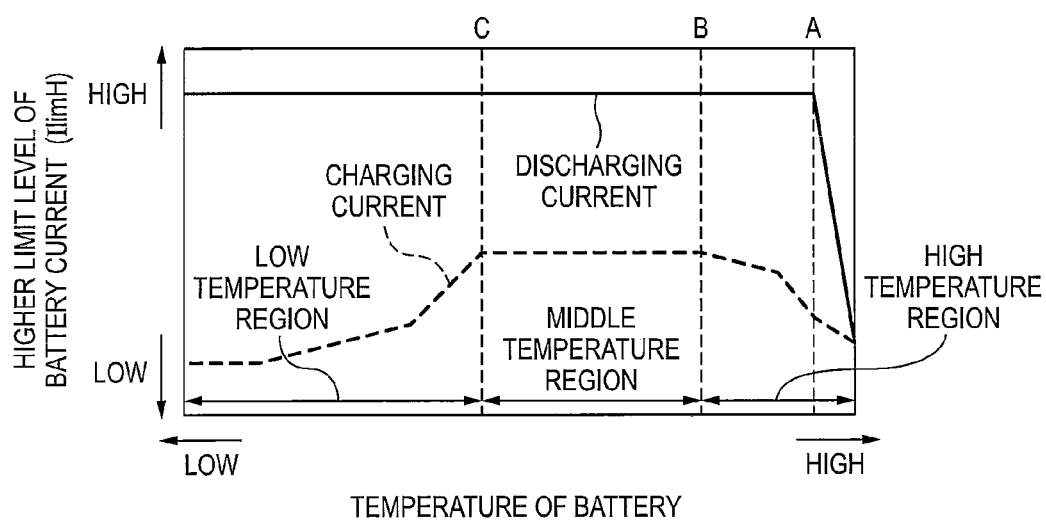
FIG. 4 is a graph showing the relationship between a temperature of a battery and a higher limit level of a battery current.

The higher limit level IlimH of the battery current is set based on a temperature of a battery. FIG. 4 is a graph showing the relationship between the temperature of the battery and the higher limit level IlimH of the battery current. The solid line indicates the higher limit level of the discharging current and the broken line indicates the higher limit level of the charging current, in FIG. 4.

As shown in FIG. 4, in the region in which the temperature of the battery is high, both of the charging current and the discharging current are controlled so that the higher limit level IlimH is lowered. In the region in which the temperature of the battery is low, only the charging current is controlled so that the higher limit level IlimH is lowered. The reason is that: in the region in which the temperature of the battery is high, as the temperature of the battery at the time when the battery is charged or discharged increases, it aims at preventing the battery from being deteriorated due to heat caused by the increase of the temperature of the battery; and in the region in which the temperature of the battery is low, as it is hard to charge the battery thereby internal short may be frequently occurred due to the over-charging current, it aims at preventing the battery from being deteriorated due to the internal short.

In the region between the point B and the point A in the high temperature region shown in FIG. 4, the higher limit level of the discharging current is not lowered and the higher limit level of the charging current is lowered. The reason is that since it is expected that the battery is cooled by receiving the wind due to the running, thereby it is difficult to increase the temperature of the battery, the discharging current is intentionally controlled so that the higher limit level is not lowered. To prevent the battery from being deteriorated due to the heat, the higher limit level of the discharging current may be lowered in the region between the point B and the point A in FIG. 4. The middle temperature region (the region between the point C and the point A in FIG. 4) corresponds to the range of about 10 to 40 degrees Celsius in the embodiment, however it depends on the property of the battery.

In this manner, according to the third torque control, in a case where the battery current Ibat exceeds the higher limit level IlimH, the suppression torque T' for maintaining the battery current Ibat as to be equal to the higher limit level IlimH, is calculated, and one of the suppression torque T' and the request torque Treq which is a smaller one is set as a final torque command value T''.

As described above, in the third torque control, a torque control of the motor generator 2 is performed so that the battery current Ibat does not exceed the higher limit level IlimH, thereby preventing the battery 3 from being deteriorated due to over current. Even in the third torque control similarly to the first torque control and the second torque control, the feed forward control is performed thereby the torque control of the motor generator 2 can be performed quickly in response to a change of the operation of the motor generator 2. Thus, the battery current Ibat can be maintained as to be equal to the higher limit level IlimH certainly.

Meanwhile, in the embodiment described above, all of the first torque control, the second torque control and the third torque control are performed. However, any one of these torque controls, or a combination of two torque controls may also be performed.

According to an aspect of the present invention, a request torque of an electric motor is suppressed by a torque suppression unit thereby a battery voltage or a battery current is controlled not to exceed or fall below the limit level. Thus, a battery is prevented from being deteriorated due to an over charge and an over discharge of the battery.

Particularly, by the torque suppression unit, a request torque is set based on a rotational angular speed so that an integrated value of a torque and a rotational angular speed of an electric motor is identical to an integrated value of the torque and the rotational angular speed of the electric motor at a point of time when a battery voltage or a battery current reaches the limit level. Thus, the battery voltage or the battery current can be controlled quickly not to exceed or fall below the limit level even though an operation of the electric motor is changed.

According to an aspect of the present invention, when the electric motor is driven and the battery is discharged, for example, even though the vehicle is accelerated thereby the driving current of the electric motor is increased, the battery voltage is controlled not to fall below the lower limit level. Thus, an over discharge of the battery can be prevented.

According to an aspect of the present invention, when regeneration charge is performed, for example, even though the vehicle runs along a downhill thereby the charging current of the electric motor is increased, the battery voltage is controlled not to exceed the higher limit level. Thus, an over charge of the battery can be prevented.

According to an aspect of the present invention, when the regeneration charge is performed or the electric motor is driven, even though the consumption current or the charging current of the battery is increased, the battery current is controlled not to exceed the higher limit level. Thus, the battery can be prevented from being deteriorated.

According to an aspect of the present invention, as the higher limit level of the battery current is set based on a temperature of the battery, the battery can be efficiently charged and discharged in response to a change in an acceptable amount of the battery current, which is caused by a change of the temperature of the battery.

According to an aspect of the present invention, the higher limit level of the battery current is set low in the region of the high temperature when the battery is discharged. Thereby, overheat of the battery can be prevented. The higher limit level of the battery current is set low in the region of the high temperature when the battery is charged. Thereby, overheat of the battery can be prevented. Further, the higher limit level of the battery current is set low in the region of the low temperature when the battery is charged. Thereby, an internal short caused by the over-charging current in the region of the low temperature can be prevented.

According to an aspect of the present invention, when the battery voltage or the battery current exceeds or falls below the limit level, since the request torque of the electric motor is compensated based on the difference between the limit level and the battery voltage or the battery current, the battery voltage or the battery current can be controlled not to exceed or fall below the limit level, for example, even in a case where the power consumption in an electric device other than the electric motor mounted in the vehicle is changed or even in a case where a function of a feed forward control is insufficient.

What is claimed is:
1. A control apparatus of an electric vehicle, the electric vehicle operable to be driven by supplying electric power from a battery to an electric motor to drive the electric motor and operable to perform regeneration charge to charge the battery by electric power generated by the electric motor using deceleration energy, the control apparatus comprising:

a request torque calculating unit calculating a request torque of the electric motor;

a motor control unit controlling the electric motor based on the request torque calculated by the request torque calculating unit; and a torque suppression unit suppressing the request torque of the electric motor so that a battery voltage or a battery current does not exceed or fall below a limit level when the electric motor is driven or the regeneration charge is performed, the torque suppression unit storing a torque of the electric motor and a rotational angular speed of the electric motor at a point of time when the battery voltage or the battery current reaches the limit level, the torque suppression unit performing a feed forward control for setting the request torque based on the rotational angular speed of the electric motor so that an integrated value of the torque of the electric motor and the rotational angular speed of the electric motor at time when the electric motor is driven or the regeneration charge is performed is identical to an integrated value of the torque of the electric motor and the rotational angular speed of the electric motor which are stored at the point of time when the battery voltage or the battery current reaches the limit level.

2. The control apparatus according to claim 1, wherein the limit level includes a lower limit level of the battery voltage when the battery is discharged.

3. The control apparatus according to claim 1, wherein the limit level includes a higher limit level of the battery voltage when the battery is charged.

4. The control apparatus according to claim 1, wherein the limit level includes a higher limit level of the battery current when the battery is charged or discharged.

5. The control apparatus according to claim 4, wherein the higher limit level is set based on a temperature of the battery.

6. The control apparatus according to claim 5, wherein
when the battery is discharged, in a high temperature region of the temperature of the battery, the higher limit level is lower than that in a middle temperature region of the temperature of the battery, and
when the battery is charged, in a high temperature region and a low temperature region of the temperature of the battery, the higher limit level is lower than that in a middle temperature region of the temperature of the battery.

7. The control apparatus according to claim 1, wherein the torque suppression unit performs a feed back control for compensating the request torque of the electric motor based on a difference between the battery voltage or the battery current and the limit level when the battery voltage or the battery current exceeds or falls below the limit level.

\* \* \* \* \*